June 6, 1961     D. E. MacDONALD     2,986,841
EARTH WORKING AND TREATING APPARATUS
Filed July 6, 1959     2 Sheets-Sheet 1
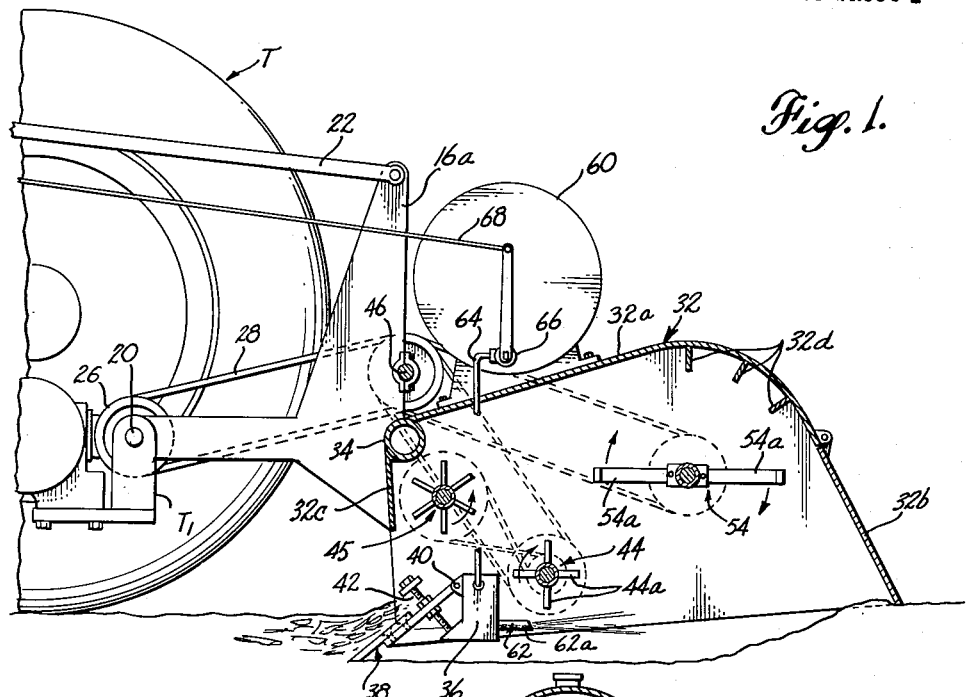
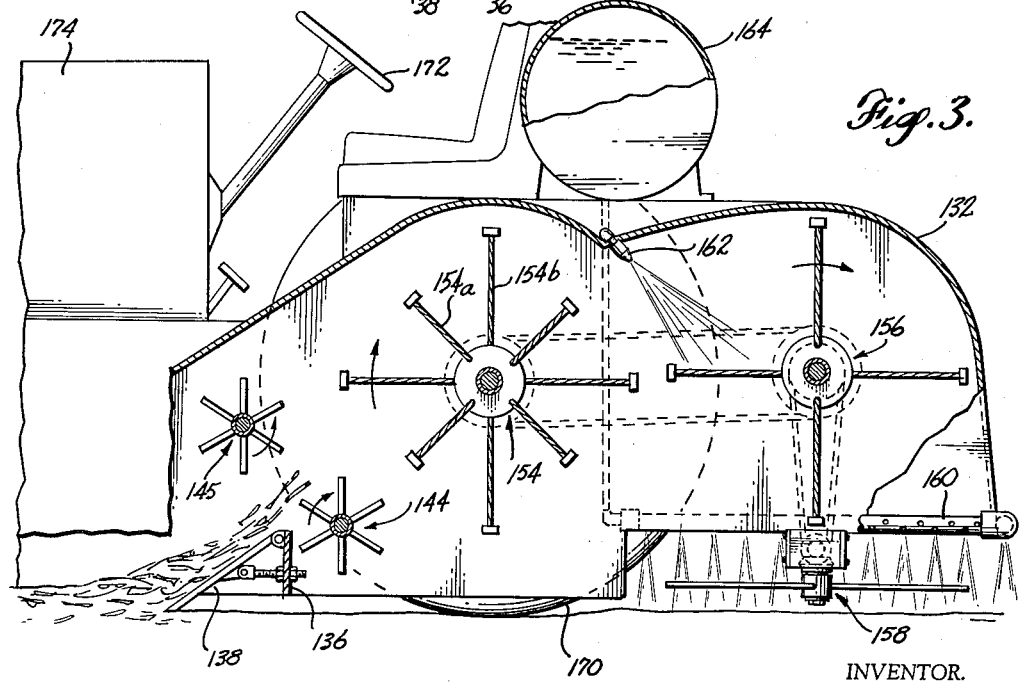
INVENTOR.
DONALD E. MACDONALD
BY
Reynolds, Beach & Christensen
ATTORNEYS June 6, 1961          D. E. MacDONALD          2,986,841
EARTH WORKING AND TREATING APPARATUS
Filed July 6, 1959          2 Sheets-Sheet 2
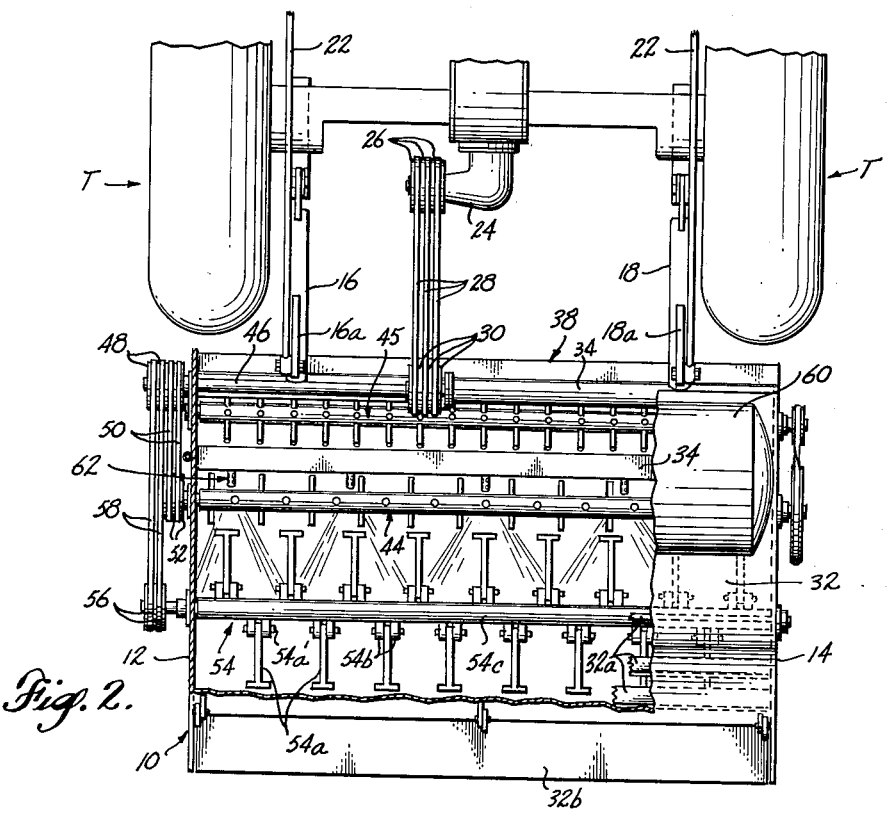
INVENTOR.
DONALD E. MACDONALD
BY
ATTORNEYS

United States Patent Office 2,986,841
Patented June 6, 1961

2,986,841
EARTH WORKING AND TREATING APPARATUS
Donald E. MacDonald, P.O. Box 36, Leavenworth, Wash.
Filed July 6, 1959, Ser. No. 825,206
15 Claims. (Cl. 47—1)

This invention relates to improvements in earth working and treating apparatus and more particularly concerns a mobile device of this character applicable to a variety of agricultural and forestry methods, among others. The invention is herein illustratively described by reference to the presently preferred form thereof; however, it will be recognized that certain modifications and changes therein with respect to details may be made without departing from the essential features involved.

The terms "earth" and "earth materials" as used herein are intended to include not only soil or sod comprising the inorganic surface material and vegetation growing thereon, but also materials and objects of an organic nature lying thereon such as leaves, branches, cuttings, and other deposits. Depending upon the particular application of the invention in a given case, the operation of the machine may or may not break into the actual sod or soil surface in its process of working and treating the earth materials over which it passes on the ground. For example, in the formation of a forest fire barrier trail the machine may only be required to comminute combustible surface materials such as leaves, twigs, branches, etc. and treat the pieces with a fire retardant substance. In that case the machine may be set and operated to penetrate only to the limited depth of the materials likely to ignite and spread the forest fire. On the other hand, when it is used in the extermination of weeds, insects, fungi and other pests, a depth sufficient to lift sod and treat it effectively is ordinarily necessary or desirable. One of the important objects of the invention is its high degree of versatility to perform diverse functions and to perform a number of them simultaneously if desired.

A typical application of the invention for agricultural purposes, for example, comprises the working and treatment of the earth materials in a fruit orchard. In such cases the extermination of various forms of fungus, over-wintering insects, moisture-stealing weed growth, etc., is a continual problem not satisfactorily handled by existing apparatus or techniques except at unusually high costs of labor and materials. Moreover, considerable cost is involved in disposing of the cuttings from the fruit trees in the pruning season particularly so as to return this material as mulch into the soil. At the same time, the usual costs of otherwise maintaining the soil in a workable and productive condition are presented, including cultivation, fertilization, treatment for mineral deficiency, etc.

A broad object of the present invention is to provide apparatus which is operable to perform one or more of these functions at relatively low cost, simultaneously if desired, and in an efficient and rapid manner.

A more specific object is to provide such apparatus which is capable of working the soil and other earth materials while the same are being treated for one or more specific purposes, the entire process being performed in one traverse of the machine across the areas selected. A related object is to provide for the efficient and thorough treatment of earth materials with a minimum effort and using a minimum quantity of treatment materials. For instance, the extermination of over-wintering insects by burning is performed more efficiently and rapidly than in prior techniques, with less consumption of fuel and with a greater degree of thoroughness and depth penetration. Moreover, in applications wherein insecticides, fertilizers or other treatment materials are spread, the job is performed by the machine in a more thorough, rapid, uniform and penetrating manner than heretofore and with less losses due to dispersement by wind, over-saturation and undersaturation treatment, etc. In addition, accompanying these functions and as a related function, the machine operates on the soil to break it up and loosen the pack in an efficient cultivating operation yielding better resultant aeration and moisture retention properties than heretofore. Its application to contain forest fires has already been mentioned, to cite another example.

These and other objects of the invention, together with the various features and related advantages of the same will become evident from the following description based on the accompanying drawings. In this it will be evident that certain novel features reside in the mobile earth material working and treatment apparatus by which the earth materials are raised or peeled to a given or selected depth, are thereupon thoroughly broken up or comminuted into a number of smaller pieces, or even pulverized, flung into air suspension, and while air-suspended are subjected to the effect of a sprayer device such as a flame-thrower, an insecticide sprayer, or other device which thoroughly penetrates and treats the cloud of pieces and particles so suspended and separated from each other, so that upon falling back to the ground a loosely packed and uniformly treated deposit layer of material depth results. In this same connection, certain features also reside in the beater means by which the initial layer of materials, lifted or peeled from the ground surface, are initially struck repeated fracturing or separating blows incident against the root side or underside thereof, thereby more efficiently to break up the earth materials, particularly the sod. Preferably additional pulverizing blows are then applied at materially higher velocity to complete the fragmentation or pulverization of the materials flung rearwardly by the first beater. The resulting air-suspended particles, confined within a hood-like enclosure, then settle back onto the ground through the operating field of the sprayer device by which they are thoroughly treated as desired. Still another feature resides in the specialized emobdiment, particularly for fire trail applications, by which the suspended materials, upon descending through the field of the fire retardent sprayer device are then incident upon a rotary impeller and/or cutter which spreads them out broadcast fashion over a substantial area to the sides and to the rear in order to provide a relatively wide barrier composed of a layer of material treated with a fire retardant. These and other features and aspects will be recognized as the description proceeds.

Figure 1 is a side elevation view of the apparatus in its presently preferred form adapted for operation as a farm tractor attachment useful in fruit orchards and other agricultural applications, the view showing certain parts broken away for clarity of illustration.

FIGURE 2 is a top view of the apparatus with portions of the hood broken away to show interior construction.

FIGURE 3 is a side elevation view with parts broken away showing the modified apparatus particularly suitable for fire barrier applications and other applications in which the earth materials worked are likely to include sizeable branches or heavy sod to be thoroughly comminuted.

As shown in FIGURES 1 and 2 the device is in a form adapted to be mounted, drawn and controlled on and from the back of a conventional farm tractor T of which there are a number of generally similar makes in common use. The novel apparatus, for its basic mobile support and frame assembly, comprises the carriage 10 having oppositely situated upright plate-like frame sides 12 and 14 and a forwardly projecting supporting tongue made up in part of transversely spaced parallel draw bars 16 and 18. The forward ends of these bars are mounted on the tractor frame, pivoted at 20 on a common horizontal axis. Such pivotal support for the arms 16 and 18 is provided by tractor-mounted brackets T1. Upwardly projecting arms 16a and 18a rigid with the draw bars respectively provide levers by which, through links or lines 22, the carriage may be raised and lowered, swinging on its pivots 20.

The tractor also includes a power take-off unit 24 having multiple output sheaves 26 which may be engaged by V-belts 28 also encircling driven sheaves 30 to apply drive power to rotary elements to be described.

The carriage frame side plates 12 and 14 serve as the sides of a partially enclosing hood which further includes a top or cover portion 32 extending from its upright elevated front curtain portion 32c upwardly and rearwardly through a top portion 32a, thence downwardly to a hinged trailing gate or flap portion 32b. Transverse reinforcing tube 34 extends between opposite side plates at the upper forward portion of the carriage. Near the bottom of the carriage at the forward portion of the hood a transverse supporting bar 36 is mounted, extending between the frame sides 12 and 14. This bar supports the transversely extending deflector blade, or plowlike bit, assembly 38. The upper rear edge of this "ground-peeling" deflector is pivoted at 40 on the bar 36 to permit adjustive movement, up or down, of the deflector's lower edge in relation to the carriage. Such adjustment is effectuated by means of the adjusting bolts 42 located at intervals along the bar. In this manner, also by raising or lowering the entire carriage, the thickness of the layer of earth materials lifted for treatment may be regulated to suit the requirements of the particular job. A toothed drum 45 spaced above the bar 36 assists in feeding the layer of materials over the deflector bit, and to this end may turn idly or be power driven.

Directly behind the deflector blade 38 is mounted a first rotary beater 44 which extends transversely of the carriage and with its ends journaled in the opposite frame plates 12 and 14. This beater has rows of relatively short beater arms 44a which project radially therefrom to form a dynamically balanced rotor which is driven by a transmission including the countershaft 46 upon which the sheaves 30 are rigidly mounted, the sheave assembly 48 mounted on the end of the countershaft which projects beyond the side plate 12, the V-belts 50 and the driven sheaves 52 fixedly mounted on the end of the shaft of rotor 44 which projects beyond this side plate. The direction of rotation of beater 44 is such that the arms 44a move upwardly on the side of the beater which is adjacent to the deflector blade 38, and the beater 44 is located just beneath and behind the upper edge of the deflector 38. Consequently, earth materials which rise over the deflector are struck and fragmented by the beater arms from the root or underside of the earth materials. This is a particularly desirable mode of operation for applications in which heavy or tenaciously coherent sod is to be broken up. Moreover, this arrangement causes the broken pieces of earth materials to be flung to the rear and upwardly by the action of the first rotary beater.

Behind and somewhat above the first rotary beater 44 in this preferred embodiment is a second rotary beater 54 which comprises a rotary elongated member extending transversely within the hood and including a plurality of radially projecting arms 54a materially longer than the arms 44a of the beater 44. The beater 54 is driven by the sheaves 56 which in turn are encircled by V-belts 58 cooperatively with the associated sheaves in the assembly 48. The beater 54 is driven in the same direction as the beater 44 and at such a speed that its peripheral velocity is much higher than that of the beater 44. The function of the beater 54 is to further break up and pulverize the pieces produced by the action of the beater 44 and, in conjunction therewith, to fling these resultant particles into temporary air suspension within the confinement of the hood 32 whereby they drop in a shower upon the ground. Preferably, in this embodiment, the beater arms 54a comprise elongated bar-like members with laterally projecting flanges or lugs on their outer ends, as shown best in FIGURE 2, giving them transverse spread and additional mass. Their inner ends are pivotally mounted at 54a' on supporting lugs 54b carried by the rotary beater shaft 54c. These arms 54a are mounted at intervals along the length of the shaft 54c preferably in straight rows, of which there are two in oppositely located positions in the example. During rotation, centrifugal force causes them to extend radially. However, the pivotal mounting of the inner ends provides a degree of yieldability minimizing the shock of impact on heavy, hard objects such as a large stone which may be picked up by the apparatus.

Mounted on the carriage above the hood 32 in this instance is a tank 60 which comprises a suitable treatment substance for application to the sprayer device 62. The sprayer device in this instance comprises a multi-nozzle flame-thrower or burner 62a mounted on the transverse bar 36 at a level immediately below the beater 44. The burner nozzles are spaced apart along the length of the bar 36 and are directed generally horizontally in a rearward direction into the region generally beneath the two beaters, so that the continuing shower of fragmented or pulverized earth materials fall into and through the intensely hot flame region produced by the burners. Because the flames and hot gases mingle with and pass between the particles and because the latter are of reduced size and in a separated, suspended state, thorough burning action is provided which will kill over-wintering insects and other pests as well as certain weed growth. A suitable connecting pipe 64 and control valve 66 with an actuating rod 68 regulates delivery of fuel to the burners in order to increase and decrease the flame intensity. The action of the burners is or may be similar to that of a conventional blow-torch type weed burner and therefore, as an element, needs no separate detailed description herein.

The hood serves the multiple cooperative function of confining the shower of suspended particles to the field of the burner and of containing the intense heat of the burner so as to increase its effectiveness. Moreover, the hood serves as an impact element by which particles flung by the beaters are further reduced in size. Baffles 32d projecting inwardly toward beater 54 are of assistance in this regard. Air currents created by the flails 54a rotating at high speed carry the light materials, including much of the elements to be destroyed, against and along the hood surface where intense heat radiation from the surface adds to the effect of the direct flame in achieving the desired result.

It will be recognized that, in lieu of burners for the sprayer device 62, other forms of sprayer devices may be used, including insecticide sprayer units, fertilizer sprayer units, fungicide sprayer units, etc. In each instance, it is preferred that the sprayer unit be adapted to atomize or break up the particles of material to thoroughly permeate a region within the hood so as to produce a large field of effective coverage through which the particles drop in returning to the ground. With such an arrangement the individual particles of earth materials pass through the flames or impact with the sprayed particles to be coated or covered thereby in a largely uniform manner. A relatively small quantity of treatment material is therefore utilized for the volume of materials treated as compared with a process in which the ground is merely sprayed with flames or other treatment medium without raising it into a confined, air-suspended state. Moreover, loss of liquid spray material by winds scattering it when in a spray state is largely avoided by the sheltering effect of the hood.

Referring to the embodiment illustrated in FIGURE 3, the bit assembly 138 is mounted on a transversely extending supporting member 136 at the lower forward portion of the mobile carriage assembly comprising the hood 132, largely as in the first embodiment. The overlying cooperative feed rotor 145 is power driven in this instance. In this case, however, the carriage assembly is automotive, having rear wheels 170 and forwardly situated wheels (not shown) controlled by the steering apparatus 172. Power for driving the unit and its rotors is derived from an engine 174 suitably coupled to the rotary beater 144 which corresponds to the beater 44 in the previous embodiment. Behind and above the beater 144 is a second rotary beater 154 which, in this instance, comprises a plurality of radially extending arms arranged in circumferentially spaced rows 154a, 154b, 154c, etc. These arms in alternate rows are alternately short and long, relatively, but preferably all are longer than the arms of beater 144. Preferably the arms of beater 154 comprise flexible members such as cables or chains carrying weights on their outer ends and supported on a rotary hub unit journaled in respectively opposite sides of the carriage frame. Behind the beater 154 is a third beater 156 which acts to further pulverize the materials broken up by the first two beaters. Preferably all beaters are rotated in the same direction, as indicated by the arrows.

Beneath the beater 156 is a rotary cutter and impeller 158 mounted to turn on a vertical axis and in a plane slightly above the level of the lower edge of deflector bit 138. The lower sides and rear wall of the hood 132 are open around the impeller 158 as shown to permit the impeller to broadcast the materials which fall upon it in directions to the side and to the rear. This impeller and cutter may be formed as a simple bar of rectangular cross-section or as a flat cutter blade.

A sprayer device 160 and in this instance a cooperable sprayer device 162 are both directed into the region in which the particles are in suspended state within the hood 132. A supply tank 164 is mounted on the machine at a higher elevation to deliver spray liquid to one or more of the sprayer units described. Additional supply tanks may be mounted in suitable positions if desired to provide other types of treatment liquids in the same process. In other words, one of the prayer devices 160 or 162 may deliver a liquid or substance of one type, while the other delivers a liquid or substance of a different type, either separately or simultaneously, so that the multiple functions of the device may be carried out rapidly and efficiently. In the case of flame spraying by sprayer 160, the air borne particles which are carried closely along the interior of the hood pass directly into and through the most intense region of the flames as they settle to the ground at the rear of the hood.

It will be recognized that the earth materials which are deflected up and over the blade unit 138 (or 38) and which are broken up into pieces and even pulverized are subjected to the action of a sprayer which either burns, coats or saturates the individual pieces thoroughly and uniformly in order to provide a thorough result in a relatively short period of time and with minimum loss or wastage of treatment materials. At the same time, the earth materials themselves are mixed together and if the blade bites down into the soil itself, any tree cuttings, leaves, mulch, etc. lying on the ground become broken up as finely divided mulch and mixed with the soil when redeposited. Organic materials thus mulched into the soil decompose more rapidly and improve the soil that much more quickly. These and other aspects of the invention will be evident to those skilled in the art.

I claim as my invention:

1. Mobile earth working and treating apparatus comprising a ground traversing carriage, a forwardly and downwardly inclined deflector bit mounted on said carriage at earth-engaging level extending transversely in said carriage, operable to raise an earth layer over itself by advancement of the carriage, elongated rotary beater means mounted to rotate on axes extending transversely in said carriage at a location immediately behind said deflector bit and at a level whereby earth material passing over said bit is intercepted by said beater means, means operable to rotate said beater means in the direction producing upward movement of its arms on the side therof adjacent said bit, said beater means having a plurality of beater arms projecting therefrom at a plurality of locations along the length thereof to break up said intercepted earth material passing over said bit and fling the same upwardly and rearwardly, an enclosing hood mounted upon said carriage and substantially covering the beater means including a region adjacent thereto, into and against which pieces of such earth material are flung by said beater means for temporary air suspension of said pieces, said hood having sirorunding side and top walls and having an open bottom through which said pieces may drop, and earth-treating sprayer means mounted on said carriage and operatively directed into said region to treat the earth material pieces while still in suspended state in said hood created by said beater means.

2. Mobile earth working and treating apparatus comprising a ground traversing carriage, a forwardly and downwardly inclined deflector bit mounted on said carriage at earth-engaging level extending transversely in said carriage, operable to raise an earth layer over itself by advancement of the carriage, elongated rotary beater means mounted to rotate on axes extending transversly in said carriage, including a first rotary beater mounted in the carriage immediately behind the bit, a second rotary beater mounted in the carriage behind the first rotary beater, and means driving said rotary beaters in the same direction with the second having materially higher peripheral speed than the first, said beaters being driven in the direction producing upward movement of the arms thereof on the side adjacent said bit, said beater means having a plurality of arms projecting therefrom at a pluraltiy of locations along the length thereof to break up said earth materials passing over said bit and to fling the same upwardly and rearwardly, whereby the pieces incident on the first beater are broken up and flung into the second beater which further pulverizes said pieces, a hood mounted upon said carriage and substantially covering the beater means including a region adjacent thereto, into and against which pieces of such earth material are flung by said beater means for temporary air suspension of said pieces, and earth-treating sprayer means mounted on said carriage and operatively directed into said region to treat the earth material pieces while in suspended state in said hood.

3. The apparatus defined in claim 2, wherein the hood comprises side plate means and cover plate means cooperatively defining an open-bottom enclosure.

4. The apparatus defined in claim 3, wherein the cover plate means carries a series of impact baffle members projecting inwardly toward the second rotary beater at successive locations spaced apart fore and aft generally above and to the rear of the same, and against which the earth materials are flung by the second rotary beater.

5. The apparatus defined in claim 4, wherein the sprayer means comprises a flame-thrower mounted in the carriage at a location below the level of the beaters and directed generally horizontally into the region below the second beater.

6. The apparatus defined in claim 4, wherein the sprayer means comprises a nebulizing liquid sprayer mounted in the carriage at a location below the level of the beaters and directed generally horizontally into the region below the second beater.

7. The apparatus defined in claim 2, wherein the sprayer means comprises a flame-thrower mounted in the carriage and directed into said region within the hood.

8. Mobile earth treating apparatus comprising a carriage comprising an open-bottom substantially enclosing hood, earth-engaging means mounted in said carriage extending transversely therein and operable to raise the top layer of earth materials during advancement of the carriage, earth material pulverizing means mounted in said hood behind said earth-engaging means and at a level whereby earth material raised by said earth-engaging means is intercepted by said pulverizing means, said pulverizing means having beater elements projecting therefrom and moved upwardly and aft on the side of the pulverizing means which intercepts said earth materials, thereby to fling the same upwardly and aft, in pulverized state, into temporary air suspension in said hood, and earth-treating sprayer means mounted on said carriage and operatively directed within said hood into the region of suspension of said materials to treat directly thereby the earth material pieces while still in suspended state in said hood created by said pulverizing means.

9. The apparatus defined in claim 8, wherein the sprayer means comprises a flame-thrower mounted in the carriage and directed within the hood directly against the air-suspended pulverized materials.

10. The apparatus defined in claim 8, and rotary impeller means mounted in said carriage beneath said pulverizing means, said impeller means being driven on a substantially vertical axis and comprising a plurality of radially projecting arms upon which the pieces fall to be broadcast by said arms, the lower side and rear portions of the hood being open for scattering of the materials, said sprayer means comprising a source of fire retardant material and means to discharge such latter material in a finely divided state into and upon the air-suspended earth material particles to render the combustible particles fire retardant thereby.

11. Mobile earth treating apparatus comprising a carriage comprising an open-bottom substantially enclosing hood, earth-engaging means mounted in said carriage extending transversely therein and operable to raise the top layer of earth materials during advancement of the carriage, earth material pulverizing means mounted in said hood behind said earth-engaging means and at a level whereby earth material raised by said earth-engaging means is intercepted by said pulverizing means, said pulverizing means comprising a first elongated transversely extending rotary beater mounted behind the earth-engaging means, a second elongated transversely extending rotary beater mounted behind the first, said rotary beaters having projecting beater arm members at a plurality of locations along their respective lengths, with the arms of the second rotary beater being materially longer than those of the first, and drive means operable to drive the rotary beaters with the peripheral velocity of the second materially exceeding that of the first, said first rotary beater intercepting earth material raised by said earth-engaging means and pulverizing the same while flinging it upwardly and aft into temporary air suspension in said hood, and flame-thrower means mounted in the carriage and directed within the hood directly against the air-suspended pulverized material to treat the same while in the suspended state.

12. The apparatus defined in claim 11, wherein the arms of the second rotary beater comprise elongated flexible metal members having weighted outer ends.

13. The apparatus defined in claim 12, wherein the arms of the second rotary beater are arranged in rows extending lengthwise thereof at circumferentially spaced locations therearound, the arms of one row being materially longer than those of an adjacent row.

14. A tractor attachment for earth treating purposes comprising a carriage frame having a forwardly extending tongue portion adapted for mounting on a tractor to be drawn thereby, said frame having transversely spaced frame sides, a forwardly and downwardly inclined deflector bit mounted at earth-engaging level extending transversely between said frame sides, operable to raise an earth layer over itself by advancement of the carriage, a hood into which said deflector bit directs such earth layer, earth-material pulverizing means mounted in said hood behind said deflector bit and at a level whereby earth material passing over said bit is intercepted by said pulverizing means, said pulverizing means having a plurality of beater arms projecting therefrom at a plurality of locations along the length thereof to break up said intercepted earth material passing over said bit, and fling the same into temporary air suspension in said hood, and earth-treating sprayer means mounted on said carriage and operatively directed within said hood into the region of suspension of said materials to treat the earth material pieces while in suspended state in said hood.

15. Mobile earth treating apparatus comprising carriage means including an open-bottom, ground-traversing, enclosing hood, ground-engaging earth working means mounted in said carriage means and operable to break up the upper earth materials and fling the same upwardly into temporary airborne suspension in said hood, and sprayer means mounted in said carriage means at a relative location therein to direct its spray into the hood region occupied by such suspended materials, thereby to treat such materials directly while in the separated and suspended state and before they drop back to the ground.

References Cited in the file of this patent
UNITED STATES PATENTS

| 1,906,127 | Reishus | Apr. 25, 1933 |
| 2,858,755 | Toulmin | Nov. 4, 1958 |
| 2,884,742 | Moore | May 5, 1959 |

FOREIGN PATENTS

| 120,587 | Great Britain | Nov. 21, 1918 |